United States Patent

[11] 3,523,568

| [72] | Inventor | Berardus van Leeuwen<br>Zevenaar, Netherlands |
|---|---|---|
| [21] | Appl. No. | 716,266 |
| [22] | Filed | March 12, 1968 |
| [45] | Patented | Aug. 11, 1970 |
| [73] | Assignee | Lever Brothers Company<br>New York, New York<br>a Corp. of Maine |
| [32] | Priority | March 13, 1967 |
| [33] | | Luxembourg |
| [31] | | No. 53170 |

[54] CONCENTRATING LIQUID SOLUTIONS AS FILMS ON GAS SWEPT ROTATING HOLLOW POROUS MEMBERS
4 Claims, 3 Drawing Figs.

[52] U.S. Cl.................................................. 159/6,
55/16, 202/236, 202/200, 203/89
[51] Int. Cl........................................................ B01d 1/22
[50] Field of Search............................................ 159/6,
poroustube, micropores, 2 liquids; 55/16, 158, 400,
409; 99/inq.; 210/inq.; 202/236; 203/89, 49

[56] References Cited
UNITED STATES PATENTS

| Re. 26,097 | 10/1966 | Michaels | 210/321 |
| 2,069,389 | 2/1937 | Peebles | 55/92 |
| 2,433,741 | 12/1947 | Crawford | 55/16 |
| 3,361,645 | 1/1968 | Bodell | 55/16 |
| 3,398,091 | 8/1968 | Greatorex | 210/23 |

FOREIGN PATENTS

| 568,726 | 4/1945 | Great Britain | 159/Porous member |
| 596,912 | 4/1960 | Canada | 159/2(MS)UX |
| 1,027,314 | 5/1953 | France | 159/4(CC)UX |

*Primary Examiner*— Norman Yudkoff
*Assistant Examiner*— J. Sofer
*Attorney*— Louis F. Kline, Jr.

ABSTRACT: Aqueous solutions containing volatile components may be concentrated by flowing the solution as a thin film over one side of a membrane which selectively transmits water but retains the volatiles in the solution, the transmitted water being removed from the other side of the membrane by a drying gas. The membrane is preferably cylindrical or conical, and may be rotated.

Patented Aug. 11, 1970

Inventor:
Bernardus Van Leeuwen
By Tomus F. Kline, Jr.
His Attorney

CONCENTRATING LIQUID SOLUTIONS AS FILMS ON GAS SWEPT ROTATING HOLLOW POROUS MEMBERS

The invention relates to concentrating aqueous solutions containing volatile components.

In concentrating such liquids use is made of a selective membrane, which during the concentration generally transmits water but retains organic volatile substances or transmits these substances to a lesser degree, a phenomenon which in foodstuffs is called flavour retention. One side of the membrane is in contact with the liquid to be concentrated, whereas the other side of the membrane is in contact with a drying gas phase, which evaporates and removes the water transmitted through the membrane. The selective membrane thus forms a partition wall between the aqueous liquid and the drying gas phase. Suitable membranes and their use are described in British Patent 568,726. In that case a hydrophilic, organic, selective membrane is manufactured and used for evaporating the water from an aqueous solution containing volatile organic substances through the membrane. The membranes are used, inter alia, in the form of stationary tubes, through which the liquid to be concentrated is passed in such a way as to completely fill the tubes, dry air of about 45°C being circulated around the tubes. The method has been applied, inter alia, for the concentration of coffee extract.

An object of the invention is to provide a process and apparatus for concentrating aqueous solutions containing volatile components, with minimum loss of volatiles.

Other objects of the invention are to provide concentration which is rapid, and is uniform throughout the liquid being concentrated.

The invention provides a process for concentrating aqueous solutions containing volatile components, by extracting water by means of a membrane which forms a partition wall between the aqueous solution and a drying gas phase, and which transmits water and substantially retains the volatile components in the aqueous solution, wherein the solution flows as a thin liquid film over one surface of the membrane. Preferably, the vapour space adjacent the flowing liquid film is substantially a closed space, and preferably the flowing film extends over substantially the whole surface of one side of the membrane. Generally, the surface area of the membrane will be large relative to the thickness of the flowing liquid film.

Since the solution during concentration is necessarily in contact with a gas space, and volatiles will vaporise from the liquid into this space, it is desirable that this space be a substantially closed space, which may become and remain saturated with volatile components without significant loss from the liquid.

In operation, the moisture content of the drying gas phase may be controlled in such a way that the moisture content of the drying gas adjacent to the membrane and the moisture content of the membrane itself on the side of the gas phase does not become too high. If the moisture content is too high, the flavour retaining property of the membrane may be destroyed. Generally, if this happens, the surface of the membrane adjacent the drying gas acquires a wet appearance, as if a thin film of moisture had formed on the membrane. In a specific case it was established that the moisture content of the part of the membrane facing the gaseous phase, up to a very slight depth, e.g. 1 μm (millimicron), should not be more than about 12%, preferably less, e.g. about 9-10%. These limits appeared to be rather insensitive to temperature. For each type of membrane the best method is to determine by experiments under which conditions the most favourable results can be obtained, in particular as regards the degree of flavour retention.

In the formula:

$$X = \frac{\text{weight percentage of lost flavour}}{\text{weight percentage of evaporated water}}$$

X represents the flavour retention. Preferably, $X \leq 0.3$, but higher values of X, up to about 0.4, are acceptable.

The use of a thin, uninterrupted, flowing layer of liquid to be concentrated will give a more homogeneous concentration of the liquid and a more concentrated liquid, with retention of the flavours, than the use of a thicker layer of liquid. The desired thickness of the liquid layer is dependent on many factors, including the viscosity of the liquid from the beginning to the end of the concentration. Favourable results can often be obtained with a thickness of the liquid layer ranging from about 1 to 0.05 mm. preferably from 0.5 to 0.1 mm.

The speed of evaporation can be raised, inter alia, by increasing the flow of drying gas, and by increasing the temperature of the drying gas and/or liquid to be concentrated.

The membrane and thus also the liquid may be heated by radiation, in particular with infrared rays, which may increase the speed of evaporation, for example 2 or 3. The sources of radiation may be located on either or both sides of the membrane.

Furthermore, a thinner membrane may result in obtaining a greater evaporative capacity than a thicker one. Thus, self-sustaining membranes having a thickness of <40-50 μm may be used very conveniently. Membranes composed of a carrier in or on which a selective layer, i.e. a layer having flavour-retaining properties, has been applied, may also be suitable, if the selective layer is thinner than e.g. 40-50 μm. Membranes thus composed, having a total thickness of carrier and selective layer of about 20-80 μm, in particular about 60 μm, also give excellent results.

Suitable selective membranes may be made of hydrophylic material, as e.g. described in British Patent Specification 568,726. Thus, membranes may be used of gelatin, casein, alginates or any other suitable material which has been rendered substantially water-insoluble. It is advantageous to use membranes supported by a porous or perforated carrier. The hydrophylic selective material is preferably applied to the carrier before concentration, but may also be applied during the initial stages of the concentration.

In case a liquid is concentrated which itself already contains hydrophylic selective material, a porous or perforated carrier may be used as such, in which case the hydrophylic layer with the desired properties is formed in the starting phase of passing the thin liquid layer over the carrier, said hydrophylic layer being formed in particular in the pores or perforations on the surface of the carrier facing away from the liquid side. During the above treatment, however, no flavour retention or an insufficient flavour retention will occur, so that then part of the liquid to be concentrated will get lost, until the desired hydrophylic selective layer is formed to a sufficient degree.

As liquids to be concentrated may be mentioned various juices and extracts, such as tomato juice, plum juice, and apple juice, coffee and tea extracts, etc. The gaseous drying medium to be circulated around the membrane is preferably hot air at a temperature of about 30-90°C, although also lower or higher temperatures may be used. The use of higher temperatures, e.g. of 120°C, would be possible, but then the residence time will mostly have to be shorter, in particular if the liquids to be concentrated are sensitive to temperature. As already set out above, the humidity of the gaseous medium should be accurately controlled and may be higher accordingly as the air velocity is greater. The gaseous drying medium flowing around the outside of the membrane entrains the moisture from the surface of the membrane, thus removing it as a vapour. It is also possible to condense the water vapour from the gaseous medium in the immediate vicinity of the gas phase of the membrane, on suitable condensers located there, so that the water vapour from the gaseous medium is mainly discharged in the form of liquid water.

Although good results may be obtained with flat membranes, it is preferred to use membranes in the form of a body of revolution, e.g. a cylinder or cone. These may be used either stationary, mounted vertically, or rotating, in which case the axis of rotation may be vertical, horizontal, or inclined between horizontal and vertical, and the solution is preferably applied to the inside of the body of revolution. The speed of rotation may either be slow, to assist in providing an even distribution of the liquid on the surface of the membrane, or more rapid, to employ centrifugal forces to assist the concentration action of the membrane.

The choice of using conical membranes may be determined by the changes in viscosity occurring during the concentration of the thin liquid layer, which, together with the degree to which the water is removed during the concentration and the supply and discharge of the liquid, affects the desired uniform thickness of the liquid layer over the entire active surface of the membrane. Thus, for concentrating a liquid whose viscosity does not change during concentration, use can be made of, for example, a vertical, conical membrane which tapers downwardly, so that the liquid layer, on flowing downward over the inner surface, during which the amount of liquid passing per time unit decreases as a result of the removal of the water, will retain a substantially uniform thickness over the entire layer. For concentrating a liquid of which the viscosity during concentration is strongly increased, use may be made, for example, of a vertical, conical membrane which tapers upwardly; the increasing viscosity will cause the liquid to flow more and more slowly during concentration, so that the thickness of the layer would increase, if the active surface were not increased also. In one preferred embodiment of the invention a horizontally rotating membrane, constructed as a body of revolution, in particular a cylindrical membrane, is used, the liquid layer being applied against the inner side of the membrane.

Not only by changing the amount of liquid supplied and discharged per time unit, but also by adjusting, before or during the concentration, the number of revolutions and/or the angle of inclination of the rotating shaft of the rotating membrane, i.e. the angle of the rotating shaft to the horizontal, it is possible to control the rate of throughput of the liquid to be concentrated, the thickness of the liquid layer flowing against the inside of the membrane and the capacity of evaporation.

At a low number of revolutions of a membrane constructed as a horizontal body of revolution, a thin continuous layer of liquid is formed against the inner wall of the membrane, mainly owing to the adhesive forces. At a high number of revolutions of the membrane, the centrifugal force predominates on forming the thin, uninterrupted layer.

By raising the speed of rotation the capacity of evaporation can be increased, which, however, involves the risk of a decrease in flavour retention. If it is desired to maintain a specific thickness of the liquid layer, the throughput of the liquid can be increased or decreased by modifying the angle of inclination of the cylindrical membrane and adjusting the supply and/or discharge of the liquid.

Several membranes may be used, coupled in series or in parallel, to increase the yield.

The use of more cylindrical, rotating membranes of a small diameter coupled in parallel is preferred to the use of one or a few cylindrical membranes of a large diameter, since in the former case with the same unit of space a larger surface of evaporation and consequently a larger capacity of evaporation can be obtained than in the latter case. Cylindrical membranes having a cylinder diameter of about 20-100 mm, in particular of 40-60 mm, thus couples, can give excellent results.

Alternatively, a stationary cylindrical or conical membrane may be used, mounted vertically, for example in the form of a vertical cylinder, so that the liquid to be concentrated can flow as a thin, substantially uninterrupted layer. The liquid is then applied in a thin layer, preferably against the inside of the membrane, for example by means of a spray disc. These stationary vertical membranes have the great advantage of permitting the formation of very thin and uninterrupted flowing layers of liquid. However, with these membranes the rate of throughput of the liquid cannot be controlled to such a degree as with rotating membranes whose angle of inclination can be varied. A slight over-pressure can be applied to maintain the shape of the membrane.

Accordingly, the invention provides apparatus for concentrating aqueous solutions containing volatile components comprising a membrane which transmits water but substantially retains the volatile components, or to which this property may be imparted during the concentration, means for forming the solution to be concentrated into a thin liquid film flowing over the surface of a first side of the membrane, means for removing water vapour from adjacent a second side of the membrane, and a containing vessel so adapted that the vapour space adjacent the first side of the membrane is substantially a closed space. Preferably the membrane is in the form of a body of revolution, e.g. a cylinder or cone. The apparatus may comprise means for rotating the membrane during concentration, and preferably also means are provided for changing the speed of rotation and/or the angle of inclination of the rotating shaft of the membrane to the horizontal before or during the concentration.

The apparatus may also comprise one or more membranes in the form of bodies of revolution coupled in parallel or in series.

Some embodiments of an apparatus according to the invention are shown in the accompanying drawings, in which.

Figure 1:
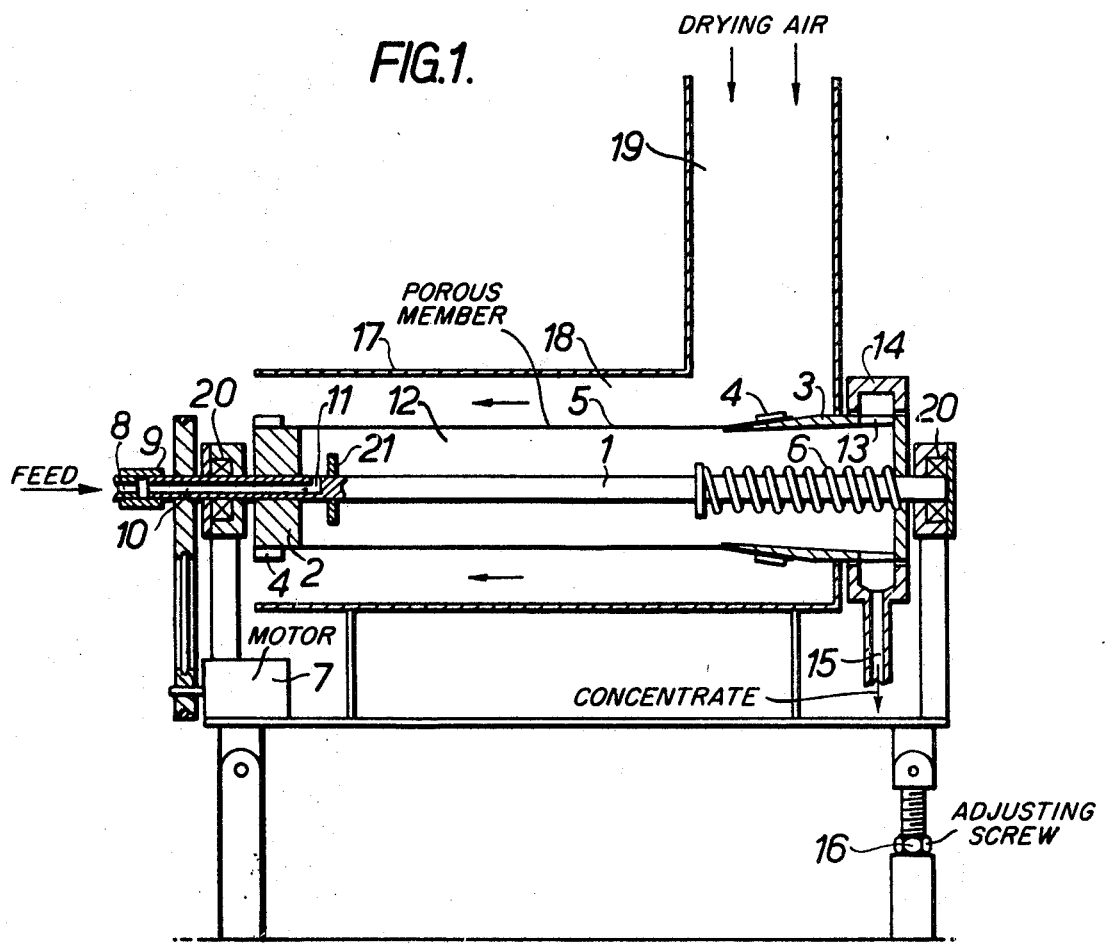
FIGURE 1 is a vertical axial section of an apparatus having a horizontal cylindrical membrane.
Figure 2:
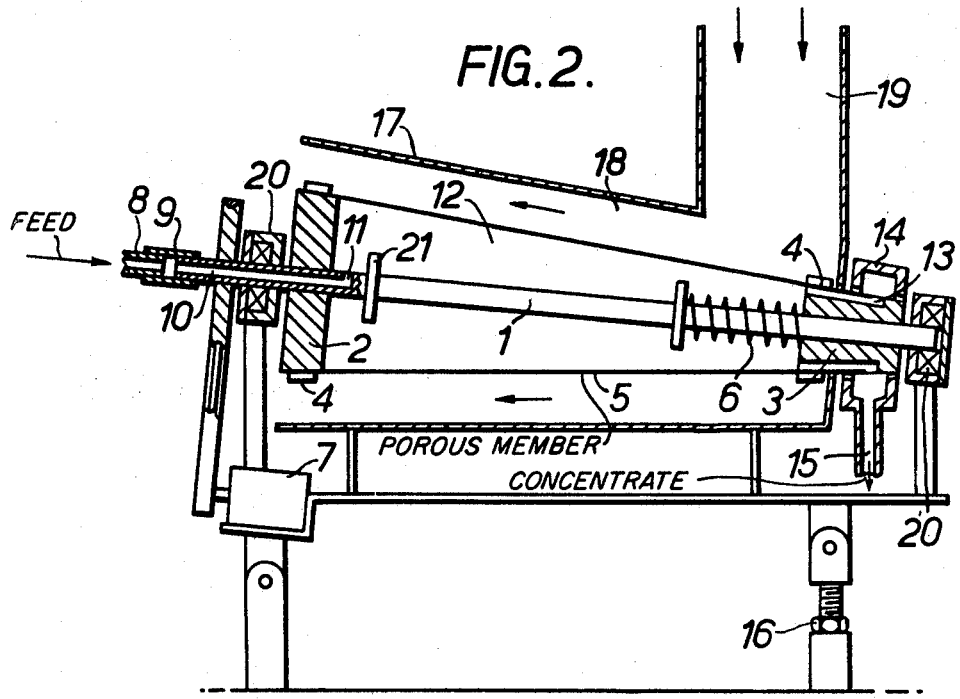
FIGURE 2 is a vertical axial section of a conical membrane.

In FIGURES 1 and 2, respectively, around the rotating shaft 1 of the horizontal cylindrical or inclined conical membrane 5, respectively, two end members 2 and 3 are provided, on which by means of soft rubber rings 4 the cylindrical membrane 5 is stretched, which is made of parchment paper (50 g/square metre), impregnated with a gum arabic solution, and which has a diameter of 48 mm, or a maximum diameter of 60 mm and a minimum diameter of 10 mm, respectively, and a length of 100 cm. The surface of evaporation, i.e. the active surface of this membrane, is about 0.13 to about 0.1 square metre, respectively. The end member 3 is so constructed as to slide axially but liquid-tightly over the rotating shaft. The membrane is axially stretched by means of a spring 6.

The rotating shaft 1 may be driven at variable speed by an electric motor 7. Via an axial channel in the stationary shaft 8, a coupling 9 and the axial channel 10 in the rotating shaft 1, which rotates in the coupling 9, the liquid to be concentrated is brought at 11 into the space 12 inside the membrane 5, after which the liquid, without delay, is guided to the inside of the membrane 5 by the guiding plate 21. On rotation the liquid will be swung against the inner wall of the membrane 5 as a more or less thin film. At the discharge end the concentrated liquid will be swung through the channels 13 into the stationary ring 14. The concentrated liquid leaves the stationary ring via channel 15. The angle of inclination may be altered by means of an adjusting screw 16. A housing 17 encloses the rotating membrane. Hot air is passed through the space 18 between the housing and the membrane. For this purpose the dry air is blown into the housing through supply opening 19. The shaft 1 is supported by the roller bearings 20.

Figure 3:
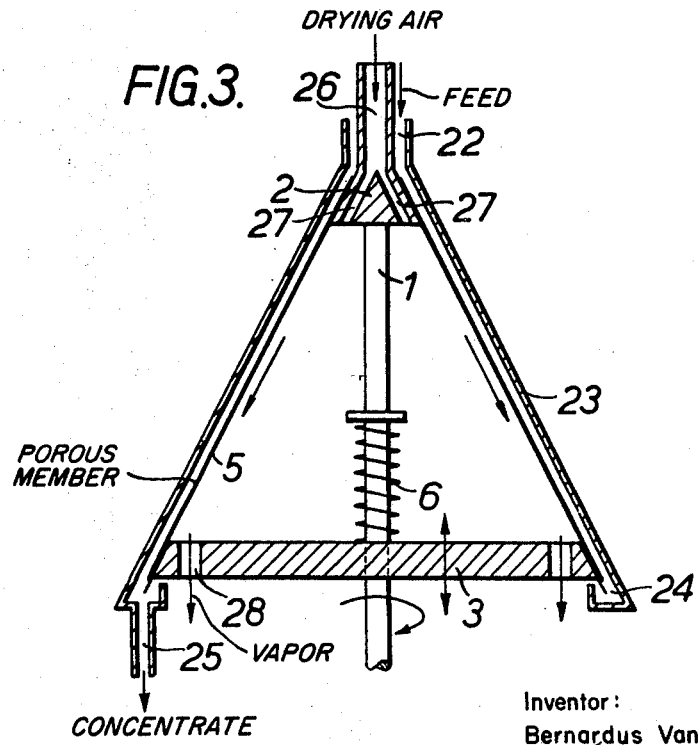
FIGURE 3 is a vertical axial section of a vertical conical membrane.

In FIGURE 3 around the rotating shaft 1, two end members 2 and 3 are mounted on which the conical membrane 5 is stretched, having a minimum diameter of about 10 mm and a maximum diameter of 100 mm and a height of 80 cm. The end member 3 is so constructed as to slide liquid-tightly around the rotating shaft. The membrane is axially stretched by means of a spring 6. The rotating shaft is driven by a motor (not shown). Via the inlet 22, formed by parts of the end member 2 and parts of the housing 23, which encloses the membrane 5, the liquid to be concentrated is brought on the outside of the conical membrane 5 and flows down along the membrane to the annular discharge chute 24 and the outlet 25. The housing 23 here provides a closed system, because the evaporation space between the housing and the liquid layer flowing over the membrane is closed from the surrounding space. Through the axial channel 26 and multiple bifurcations 27 of this channel, the hot drying air is conveyed to the inside of the conical membrane 5, where the drying air flows along the side of the membrane facing away from the liquid layer and then, loaded with water vapour, leaves the apparatus via the openings 28.

The invention will now be illustrated by the following Examples.

EXAMPLE 1

A juice, pressed from fresh oranges and containing 88% of water, is passed through the membrane concentrator of FIGURE 1. At a speed of rotation of 200 r.p.m. the supply and the discharge, as well as the angle of inclination are adjusted in such a way that the film thickness of the juice against the inside of the membrane is 0.1 mm. The feed is 0.3 l/h of fresh juice. A concentrated juice is obtained, containing 50% of water. Air of 5% relative humidity and of 80°C is passed over the membrane at a speed of 5 m/sec. After diluting with water to the original dilution, the flavour of the concentrated juice is virtually indistinguishable from that of the original juice.

EXAMPLE 2

Currant-juice, containing 91% of water, is passed through the concentrator of FIGURE 1. The speed of revolution is 200 r.p.m. The feed rate is 0.430 litres/h of fresh juice. A concentrated solution is obtained, containing 82% of water. In this case, too, practically no flavour difference can be established between the original juice and the concentrated juice after dilution to the original water content.

EXAMPLE 3

The following experiment is made to determine the values of the flavour retention obtainable according to the invention. A dextrine maltose solution, containing 10% dextrine-maltose and 0.25% acetone, is passed through the membrane concentrator according to FIGURE 1. The speed of revolution is 200 r.p.m. The supply is 0.415 litres/h of fresh solution. A concentrated solution is obtained, containing 22% dextrine-maltose and 91% of the original amount of acetone.

EXAMPLE 4

200 g tea is allowed to draw out the flavor for 15 min. in 1 litre water of 100°C. Subsequently the tea is pressed out and the extract thus obtained is cooled and centrifuged. This extract is concentrated in the rotating membrane concentrator according to FIGURE 1. The membrane is made of parchment paper of 40 g/square metre. The membrane concentrator rotates at 250 r.p.m., the angle of inclination to the horizontal being 2.5°. The extract is passed through the concentrator for 15 min. The temperature of the liquid is 50°C at the inlet and 51°C at the outlet. The temperature of the air is 80°C at the inlet and 74°C at the outlet. The extract supplied amounts to 190 ml and has a solids content of 6.4%. The concentrated extract amounts to 45 ml and has a solids content of 12%. The capacity of evaporation is 1.1 kg/sq.m/h. The flavour of the concentrate thus obtained is excellent after the required dilution.

This experiment is repeated with the same extract. The membrane, however, is now covered with a thin layer of gum arabic. 410 ml of the extract with a solids content of 6.0% is passed through the membrance concentrator for 1 ¼h. 80 ml extract is obtained, having a solids content of 13%. The capacity of eevaporation is 1.4 kg/sq.m/h.

EXAMPLE 5

In an apparatus according to FIGURE 1, but now provided with an infra-red radiation device in the lower section of the space 18 for the circulating drying air, coffee extract of 4.9° Brix, obtained by extracting coffee with water in a ratio of 1:6.7, is concentrated. The velocity of the drying air is 5 m/sec. The temperature of the drying air supplied is 78°C and that of the drying air discharged is 115°C. The temperature of the liquid at the feeding end is 54°C and that of the liquid at the discharging end 58°C. The temperature of the membrane at the inlet appears to be 64°C and that of the membrane at the outlet 66°C. Each 800 ml coffee extract of 4.9° Brix is concentrated to 368 ml concentrate of 11° Brix. After dilution this concentrate is compared organoleptically with the diluted original extract; no difference in flavour is detected.

EXAMPLE 6

Under the conditions of Example 5 a coffee extract having a solids content of 4% is concentrated to a solids content of 12%. The temperature of the drying air is 52.5°C. The membrane used is a tanned polyvinyl alcohol layer of 16 μm on gauze of stainless steel. The capacity of evaporation is 5 kg/sq.m/h.

EXAMPLE 7

In this example, a vertical, stationary cylindrical membrane is used. The liquid to be concentrated is applied in the top section of the membrane concentrator against the inner wall of the membrane by means of a spray disc rotating at 1400 r.p.m. The membrane used is made of tanned polyvinyl alcohol having a thickness of 8 μm on a carrier of stainless steel gauze. The cylinder diameter amounts to 5 cm and the longitudinal axis is 100 cm. An infra-red radiator is placed in the centre over substantially the entire length of the cylindrical membrane. A slight over-pressure is applied in the cylindrical membrane to maintain the cylindrical shape and to promote the discharge of the concentrate centrally in the lower section of the apparatus. Fruit juices, tea and coffee extracts are concentrated satisfactorily.

I claim:

1. A process for concentrating aqueous solutions containing volatile components, by extracting water by means of a porous membrane which forms a partition wall between the aqueous solution and a drying gas phase, and which transmits water and substantially retains the volatile components in the aqueous solution, comprising the steps of passing a drying gas phase over one side of the membrane while introducing the aqueous solution onto the other side of the membrane, allowing the solution to flow under gravity as a thin film over the said other side surface of the membrane, rotating the membrane to maintain the liquid as a thin film flowing over the said membrane surface, and controlling the rate of flow of the liquid film along the membrane by adjusting the angle of inclination to the horizontal of the axis of rotation of the membrane.

2. The process of Claim 1, wherein the membrane is heated by infra-red radiation from an infra-red heater mounted adjacent to the membrane.

3. Apparatus for concentrating aqueous solutions containing volatile components, comprising a hollow membrane which is a body of revolution and which transmits water but substantially retains the volatile components, or to which this property may be imparted during the concentration, means for contacting a first side of the membrane with a drying gas stream, means for supporting and rotating the membrane during the concentration, means for introducing the solution to be concentrated onto the other side of the membrane, means for adjusting the angle of inclination to the horizontal of the axis of rotation of the membrane during the concentration, and a containing vessel so shaped that the vapor space adjacent the other side of the membrane is a closed space.

4. The apparatus as claimed in Claim 3, wherein an infra-red heater is provided adjacent to the membrane at its first side.